United States Patent [19]

Hirano

[11] 4,441,567
[45] Apr. 10, 1984

[54] COMBINATION WEIGHING MACHINE

[75] Inventor: Takashi Hirano, Kobe, Japan

[73] Assignee: Yamato Scale Company, Limited, Akashi, Japan

[21] Appl. No.: 406,286

[22] Filed: Aug. 9, 1982

[30] Foreign Application Priority Data

Mar. 15, 1982 [JP] Japan ................................ 57-41407

[51] Int. Cl.$^3$ .......................................... G01G 19/32
[52] U.S. Cl. ...................................... 177/25; 177/59; 364/567
[58] Field of Search ..................... 177/25, 59; 364/567

[56] References Cited

U.S. PATENT DOCUMENTS

| | | | |
|---|---|---|---|
| 4,267,894 | 5/1981 | Hirano et al. | 177/25 |
| 4,308,928 | 1/1982 | Oshima | 177/25 |
| 4,336,852 | 6/1982 | Hirano | 177/25 |
| 4,336,853 | 6/1982 | Hirano | 177/25 |
| 4,341,274 | 7/1982 | Hirano et al. | 177/25 |
| 4,344,492 | 8/1982 | Hirano | 177/25 |
| 4,360,070 | 11/1982 | Hirano | 177/25 |
| 4,385,671 | 5/1983 | Hirano | 177/25 |

*Primary Examiner*—Joseph W. Hartary
*Attorney, Agent, or Firm*—Senniger, Powers, Leavitt and Roedel

[57] ABSTRACT

A combination weighing machine, which is typically used for packing a plurality of articles in each bag, for example, so that the contents of all bags satisfy a predetermined weight condition, comprising a plurality of weighing units for weighing the articles each at the same time to produce weight indicating signals respectively, arithmetic means for selecting some of these weight signals whose sum satisfies the abovementioned weight condition, and means for unloading and then loading those weighing units which have produced these selected weight signals; the machine also including means for excluding the weighing units which have produced the selected weight signals from the next selecting operation and allowing adjustment of operational speed of the machine by increasing the selection speed or partly superimposing the next selecting operation on the preceding unloading and loading operations.

7 Claims, 5 Drawing Figures

COMBINATION WEIGHING MACHINE

This invention relates to an improved combination weighing machine which allows adjustment of its operational speed.

The weighing device, which is generally referred to as "combination balance" or "combination weighing machine" is a device typically used for extracting a plurality of articles from a group of articles, such as candies, fruits or vegetables, having relatively large variance in their unit weights, to form a sub-group which satisfies a predetermined weight condition. The principle of such combination weighing devices is described in U.S. Pat. Nos. 3,939,928 and 4,267,894, for example. These devices include a plurality of weighing units or balances for weighing one or more articles each to produce weight indicating signals respectively, and arithmetic means for combining these weight signals in accordance with a predetermined set of mathematical combinations and extracting a specific combination which satisfies the abovementioned weight condition.

In automatically operated combination weighing machines, it is a general practice to provide each weighing unit with automatic loading and unloading means for discharging the articles from the extracted weighing units and then feeding new articles thereto, as disclosed in the opened U.K. patent specification No. 2,070,362, for example. It is understood that one cycle time of the such combination weighing machine starts with loading and ends with unloading of a specific weighing unit. A major part of this cycle time is occupied by the time necessary for stabilizing the output weight signal after loading. Though it would be most effective for speeding up the operation to reduce this stabilizing time of weighing unit, it is limited in the technical view. In the prior art combination weighing machines, it has been unavoidable to wait for an extensive time until obtaining complete stabilization of all the weighing units in order to insure high accuracy. The inventor proposed previously a combination weighing machine including means for excluding those weighing units which did not stabilize within a predetermined time to start the next cycle of operation with the other weighing units, as disclosed in the opened U.K. patent specification No. 2,077,067. This approach was substantially effective to speed up the operation until recently.

With improvement of damping means of the weighing unit, the stabilizing time has been reduced significantly and now the problem has come into the time required for combination selecting operation and loading and unloading operations. Moreover, the electronics used in the excluding means of the abovementioned U.K. patent specification No. 2,077,067 was significantly complicated and, therefore, rendered expensive.

Accordingly, an object of this invention is to provide an improved combination weighing machine in which, after some of the weighing units have been extracted but before they are not yet completely unloaded, the next combination selecting operation can be initiated with the remaining weighing units.

Another object of this invention is to provide a novel and improved combination generator which inhibits production of such combinations including the abovementioned extracted weighing units.

On the other hand, the cycle time of operation of an automatic packing machine co-operating with the combination weighing machine is generally longer in case of making large packages than in case of making relatively small packages. In order to accomodate the combination weighing machine with such variation of cycle time, it is necessary to have a machine whose cycle time of operation is adjustable.

Accordingly, a further object of this invention is to provide the inventive combination weighing machine with means for detachably coupling the abovementioned speeding-up approaches to the machine.

The abovementioned objects can be attained by the combination weighing machine according to this invention, which includes a plurality of weighing units having loading and unloading means each for weighing an article or articles each to produce weight indicating signals respectively, a plurality of normally-open switches having control terminals and corresponding to said weighing units respectively, judging means coupled to receive the weight signals of said weighing units through said switches for producing an input signal when the sum of the incoming weight signals satisfies a predetermined weight condition, a combination generator having output terminals coupled respectively to the control terminals of said normally-open switches for producing output signals successively from said output terminals in accordance with a predetermined set of mathematical combinations to close corresponding ones of said switches, a combination memory coupled to the output terminals of said combination generator for storing its current combined output signals in response to the output signal of said judging means, and control means for supplying the content of said combination memory at each end of said predetermined combination to said loading and unloading means of the respective weighing units to control them.

According to a feature of this invention, the control means comprises at least two auxiliary memories coupled to the output terminals of said combination memory for storing its combined output signals, a plurality of sub-control means corresponding to the respective auxiliary memories for reading their contents and supplying them separately to said loading and unloading means of the respective weighing units, and switch means for supplying said content read out by said sub-control means selectively to said combination generator, and the combination generator includes means responsive to the contents of said auxiliary memories for inhibiting the corresponding output signals.

According to another feature of this invention, the sub-control means corresponding to the respective auxiliary memories includes means for shifting their operation starting times with respect to each other for intervening operation.

These and other features of rhia invention will be described in more detail hereinunder with reference to the accompanying drawings.

In the drawings.

Throughout the drawings, same reference numerals and symbols are given to like or corresponding components and signals. Suffix "n" is a predetermined integral number relating to machine design and suffic "i" is an arbitrary integral number between "1" and "n".

Figure 1:
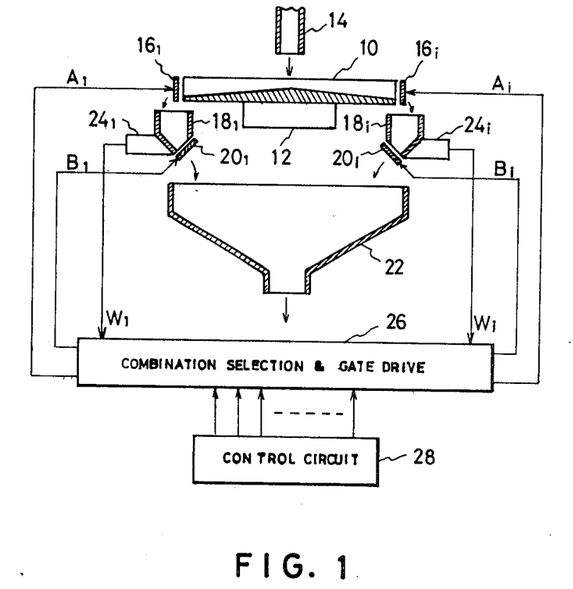
FIG. 1 is a schematic diagram representing a typical configuration of combination weighing machine to which this invention is applied.

Referring to FIG. 1, shown is an overall configuration of a typical automatic combination weighing machine. The machine includes a vibration feeder 10 having a slightly conical bottom wall and a peripheral side wall. The feeder 10 is provided with a vibrator 12 for applying vibration to the bottom wall so that articles supplied from a central chute 14 are shifted outwards to the peripheral region. The peripheral wall of the feeder 10 has a plurality of exit ports having gates $16_1$, $16_2$, ... $16_n$, respectively. The gates 16 are normally-closed and selectively opened under control of loading signals $A_1, A_2, \ldots A_n$ from a combination and gate control system 26, respectively, as described later. The machine also includes a plurality of weighing units arranged around the feeder 10 so that their weighing cradles $18_1$, $18_2, \ldots 18_n$ are located, respectively, just under the exit ports of the feeder 10, so that the articles on the feeder 10 are fed into any cradle $18_i$ when the corresponding gate $16_i$ is opened. For simplification, only two weighing units are shown in the drawing. The weighing cradles $18_1, 18_2, \ldots 18_n$ have bottom openings having gates $20_1, 20_2, \ldots 20_n$, respectively, which are normally closed and selectively opened under control of unloading signals $B_1, B_2, \ldots B_n$, respectively, which are also supplied from the combination and gate control system 26 as also described later. Each weighing unit also includes a weight sensor $24_i$, such as load cell, which produces an electric signal $W_i$, so-called weight signal, indicative of the weight of the articles in the corresponding weighing cradle $18_i$ and supplies it to the combination and gate control system 26. Under the unloading gates $20_1, 20_2, \ldots 20_n$ of the respective weighing cradles, disposed is a common collecting chute 22 for collecting the articles discharged from selected ones of the weighing units. The articles collected in the chute 22 are transferred by suitable means (not shown) for packing. The combination and gate control system 26 is controlled by various timing signals produced from a control circuit 28 as described later.

Figure 2:
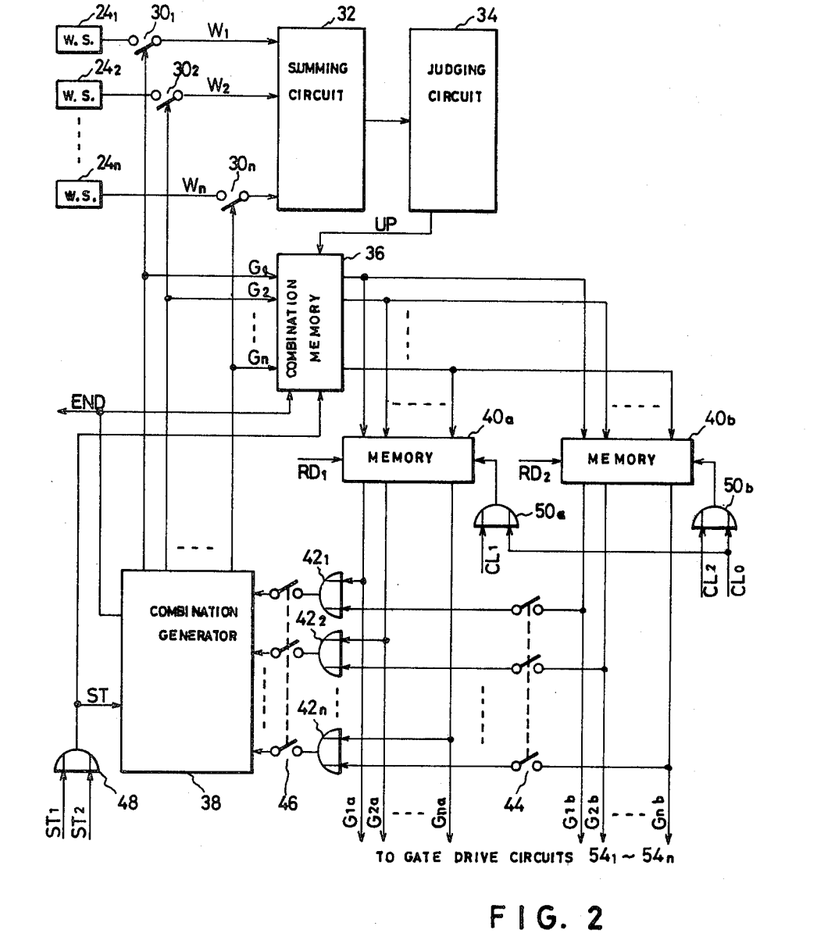
FIG. 2 is a block diagram representing a circuit arrangement of the combination selection system of FIG. 1, in which this invention is embodied.

Referring next to FIG. 2, the outputs of the weight sensors $24_1, 24_2, \ldots 24_n$ as mentioned above are coupled respectively through normally-open switches $30_1, 30_2, \ldots 30_n$ to a summing circuit 32. The summing circuit 32 sums incoming weight signals to provide a sum signal to a judging circuit 34. The judging circuit 72 compare the sum signal with a preset condition for total weight of articles and produces an update signal UP when the condition is satisfied. The judging circuit is known in the art and some examples are shown in the aforementioned U.S. patents and, especially, in the pending U.S. patent application No. 323,951 filed Nov. 23, 1981 now Pat. No. 4,416,341; in the same name of inventor, respectively. The normally-open switches $30_1, 30_2, \ldots 30_n$ have control terminals coupled respectively to n-number of output terminals of a combination generator 38.

The combination generator 38 is driven by a clock pulse train produced by a suitable clock circuit included therein and produces a binary signal "1" or "0" from the each output terminal in accordance with a predetermined set of mathematical combinations. Each normally-open switch $30_i$ is closed in response to the signal "1" to pass the corresponding weight signal $W_i$ to the summing circuit 32. As well known in the art, there are $(2^n - 1)$ combinations in total of the n-number of output terminals of the combination generator 38. In order to produce all of these combinations, the combination generator 38 may be composed of an n-bit binary counter for counting the clock pulses, having its bit or parallel outputs as the output terminals. As described later, however, the combination generator 38 of this invention is modified from the conventional binary counter so that it does not produce unnecessary combinations of the output signals. The combination generator 38 is arranged to start its operation in response to a start signal ST applied from an OR gate 48 and produce and end signal END when it completes each cycle of operation, as described later. The OR gate 48 is coupled to receive start signals $ST_1$ and $ST_2$ from the control circuit 28 as described also later.

The output signals of the combination generator 38, as shown by $G_1, G_2, \ldots G_n$, are also applied respectively to n-number of input terminals of a combination memory 36 having the same number of corresponding output terminals. The combination memory 36 is arranged to update its content with its current input signals in response to the update signal UP from the judging circuit 34 and discharge its content from the output terminals in response to the end signal END applied from the combination generator 38. The combination memory 36 is also arranged to be cleared by the start signal ST.

As a feature of this invention, the combination memory 36, in the illustrative embodiment, is accompanied by two auxiliary memories 40a and 40b. The memories 40a and 40b are arranged to store the combination output signals of the combination memory 36 when cleared and discharge their contents to gate drive circuits $54_1$, $54_2, \ldots 54_n$ which will be described later. The output signals $G_{1a}, G_{2a}, \ldots G_{na}$ of the auxiliary memory 40a are directly applied to first inputs of OR gates $42_1, 42_2, \ldots 42_n$, respectively, while the output signals $G_{1b}, G_{2b}, \ldots G_{nb}$ of the auxiliary memory 40b are applied through an n-pole single throw switch 44 to second inputs of the same OR gates, respectively, as shown. The outputs of the OR gates $42_1, 42_2, \ldots 42_n$ are coupled through another n-pole single throw switch 46 to the combination generator 38 to control the same as described later. The auxiliary memories 40a and 40b are also arranged to be cleared by clearing signals $CL_O$, $CL_1$ and $CL_2$ applied from the control circuit 28 which will be described later.

Figure 3:
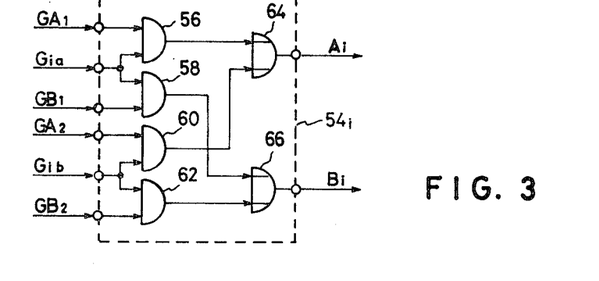
FIG. 3 is a logic circuit diagram of the gate control system co-operating with the system of FIG. 2.

The output signals of the auxiliary memories 40a and 40b are supplied to n-number of gate drive circuits $54_1$ through $54_n$ in such fashion that signals $G_{1a}$ and $G_{1b}$ are for circuit $54_1$, signals $G_{2a}$ and $G_{2b}$ are for circuit $54_2$ and so on, and, in general, signals $G_{ia}$ and $G_{ib}$ are for circuit $54_i$. All of the gate drive circuits $54_1$ through $54_n$ are exactly same in configuration and operation. As shown in FIG. 3, the gate drive circuit $54_i$ includes four AND gates 56, 58, 60 and 62 and two OR gates 64 and 66. The output signal $G_{ia}$ of the auxiliary memory 40a is applied to one input of the AND gates 56 and 58 and the output signal $G_{ib}$ of the auxiliary memory 40b is applied to one inputs of the AND gates 60 and 62. The other inputs of the AND gates 56, 58, 60 and 62 are coupled to receive control signals $GA_1$, $GB_1$, $GA_2$ and $GB_2$, respectively. The outputs of the AND gates 56 and 60 are coupled to both inputs of the OR gate 64, and the outputs of the AND gates 58 and 62 are coupled to both inputs of the OR gate 66. The OR gate 64 provides the aforementioned loading signal $A_i$ to the loading gate $16_i$ and the OR gate 66 provides the aforementioned unloading signal $B_i$ to the unloading gate $20_i$, to control these gates as described previously with reference to FIG. 1.

Figure 4:
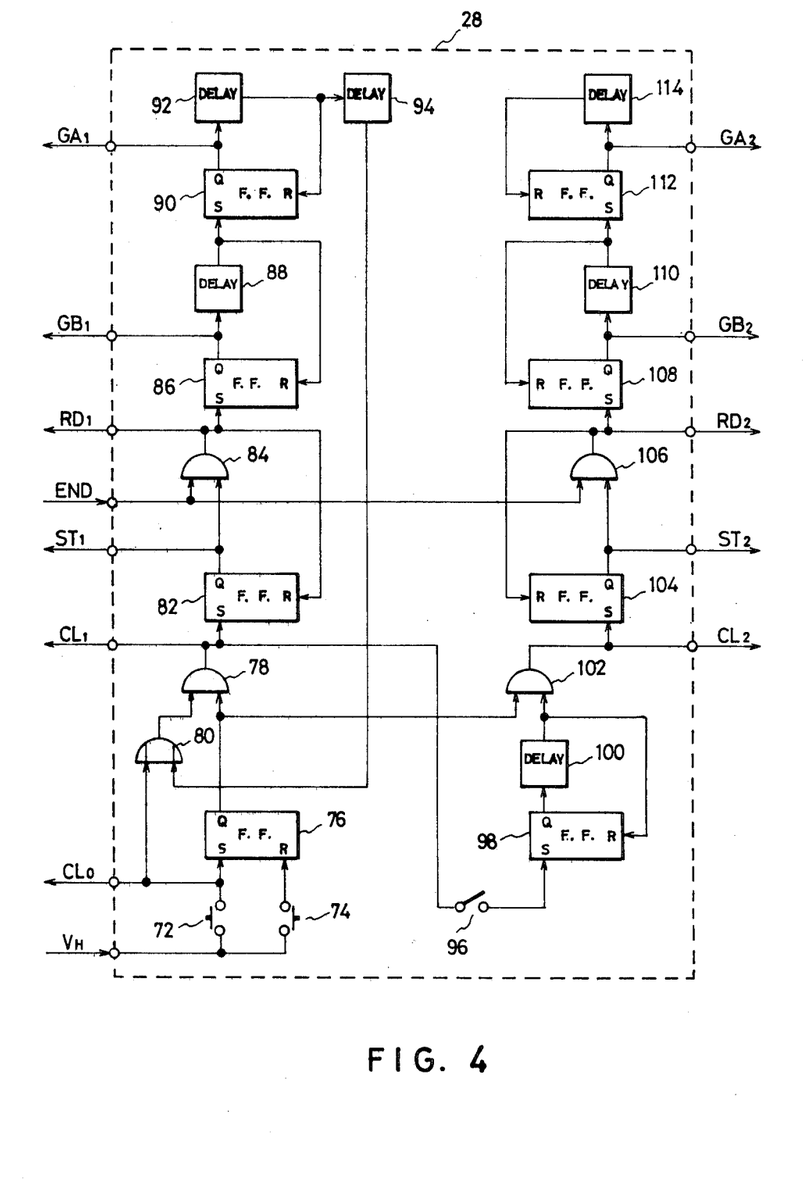
FIG. 4 is a block circuit diagram of the control circuit as shown in FIG. 1.

Referring to FIG. 4, the control circuit 28 has an input terminal for receiving logic "1" level potential from a suitable source (not shown), which is coupled through a pair of push-button switches 72 and 74 to "set" and "reset" inputs of a flip-flop circuit 76, respectively, whose "Q" output is coupled to an input of an AND gate 78. The "set" input of the flip-flop 76 is coupled through an OR gate 80 to the other input of the AND gate 78 and also coupled through the OR gates 50a and 50b to the auxiliary memories 40a and 40b, respectively, to apply the aforementioned clearing signal $CL_0$ thereto (FIG. 2). The output of the AND gate 78 is coupled to "set" input of a flip-flop 82 whose "Q" output is coupled to an input of an AND gate 84 having another input for receiving the end signal END from the combination generator 38. The output signal of the AND gate 78 is also applied through the OR gate 50a to the auxiliary memory 40a as the aforementioned clearing signal $CL_1$. The "Q" output signal of the flip-flop 82 is also applied as the aforementioned start signal $ST_1$ to the OR gate 48 (FIG. 2). The output signal of the AND gate 84 is applied to "set" input of a flip-flop circuit 86 and "reset" input of the flip-flop 82 and also applied as the aforementioned read-out signal $RD_1$ to the auxiliary memory 40a. The "Q" output of the flip-flop 86 is coupled through a delay unit 88 to "set" input of a flip-flop circuit 90 and "reset" input of the flip-flop 86 itself. The "Q" output of the flip-flop 90 is coupled through a delay unit 94 to another input of the OR gate 80. The "Q" signals of the flip-flops 86 and 90 are also applied as the abovementioned control signals $GB_1$ and $GA_1$ to the gate drive circuits $54_1$, $54_2$, ... $54_n$, respectively.

The output signal of the AND gate 78 is also applied through a single-pole single-throw switch 96 to "set" input of a flip-flop circuit 98 whose "Q" output is coupled through a delay unit 100 to an input of an AND gate 102 and to "reset" input of the flip-flop 98 itself. Another input of the AND gate 102 is coupled to receive the "Q" output of the flip-flop 76. The output signal of the AND gate 102 is applied to "set" input of a flip-flop circuit 104 and also to the memory 40b (FIG. 2) as the clearing signal $CL_2$ as aforementioned. The "Q" signal of the flip-flop 104 is applied to one input of an AND gate 106 whose other input is coupled to receive the END signal from the combination generator 38, and also to the OR gate 48 to provide the aforementioned start signal $ST_2$. The output signal of the AND gate 106 is applied to "set" input of a flip-flop 108 and "reset" input of the flip-flop 104 and also applied as the aforementioned read-out signal $RD_2$ to the auxiliary memory 40b. The "Q" output of the flip-flop 108 is coupled through a delay unit 110 to "set" input of a flip-flop 112 and "reset" input of the flip-flop 108 itself. The "Q" output of the flip-flop 112 is coupled through a delay unit 114 to the flip-flop 112 itself. The "Q" signals of the flip-flop circuits 108 and 112 are also applied as the aforementioned control signals $GB_2$ and $GA_2$ to the gate drive circuits $54_1$, $54_2$, ... $54_n$, respectively.

Figure 5:
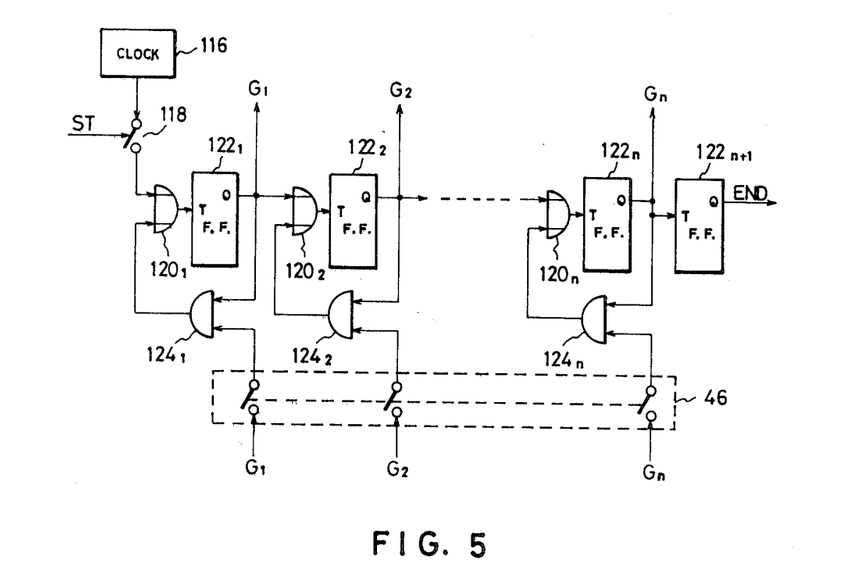
FIG. 5 is a block diagram representing an embodiment of the combination generator in the system of FIG. 2, in which a feature of this invention is embodied.

In FIG. 5, shown is an embodiment of the combination generator 38 accompanied with the n-pole single-throw switch 46 (FIG. 2), which is a modification of conventional n-bit binary counter arranged to realize a feature of this invention. The circuit includes a clock pulse generator 116 for generating a reference clock pulse train at predetermined frequency. The output pulses from the clock 116 are applied through a normally-open switch 118 arranged to close in response to the start signal ST from the OR gate 48 (FIG. 2), and through an OR gate $120_1$ to "T" input of a T-type flip-flop circuit $122_1$. The "Q" output of the flip-flop $122_1$ is coupled to one input of an AND gate $124_1$ and the output of the AND gate $124_1$ is also coupled through the OR gate $120_1$ to the "T" input of the flip-flop $122_1$. n sets of three such elements $120_i$, $122_i$ and $124_i$ are cascaded as shown and the "Q" output signals of the flip-flops $122_1$, $122_2$, ... $122_n$ are provided at the respective output terminals as the control signals $G_1$, $G_2$, ... (FIG. 2). The second inputs of the AND gates $124_1$, $124_2$, ... $124_n$ are coupled to receive the signals $G_1$, $G_2$, ... $G_n$ from the auxiliary memory 40a or 40b when the switch 46 is closed, as shown in FIG. 2. An additional T-type flip-flop circuit $122_{n+1}$ is provided for receiving the "Q" output signal from the flip-flop $122_n$ to produce "Q" output signal as the end signal END.

When the switch 46 is opened, the AND gates $124_i$ all produce binary "0" output signals to effectively remove these AND gates from the circuit. Accordingly, the circuit becomes equivalent to a conventional n-bit binary counter which produces $2^n - 1$ combinations of the output signals $G_i$ successively and, after completion of all combinations, produces the end signal END from the "Q" terminal of the last flip-flop $122_{n+1}$. However, when the switch 46 is closed, some of the output signals $G_1$, $G_2$, ... $G_n$ from the auxiliary memory 40a or 40b, which are at binary "1" level, enable the corresponding ones of the AND gates $124_1$, $124_2$, ... $124_n$. If the "Q" output signals of the corresponding flip-flops become binary "1" level under this condition, they are fed back through the enabled AND gates to the "T" inputs of the same flip-flops to convert the "Q" output levels "1" into "0" in a moment to make these output signals ineffective. This means that the combination generator 38 does not produce such a combination of output signals as same as supplied through the switch 46, or previously stored in the auxiliary memory 40a or 40b. Thus, the cycle time of operation of the machine is reduced by the time of operation executed under control of the such excluded combination signals. Though not shown in the drawing for the purpose of simplification, all the flip-flops are arranged to be reset with the END signal from the last flip-flop $122_{n+1}$.

Now, the operation of the machine will be described in detail with reference to all the drawings. The machine can execute three types of operation which can be optionally selected by the operator with manual control of the switches 44, 46 and 96.

In the first type of operation, the switches 44, 46 and 96 are all left open. Then, the combination generator 38 operates in the same fashion as a conventional n-bit binary counter and produces $2^n - 1$ combinations of output signals, successively, as mentioned above. For starting the operation, the push-button switch 72 is pushed to apply a binary "1" signal to the flip-flop 76 to set it. This signal "1" is also applied as the clearing signal $CL_0$ through the OR gates 50a and 50b to the auxiliary memories 40a and 40b, respectively, to clear them. The AND gate 78 is enabled by the signal $CL_0$ applied through the OR gate 80 and the "Q" signal of the flip-flop 76 to provide an output signal to "set" input of flip-flop 82 to set it. The output signal of the AND gate 78 is also applied as the clearing signal $CL_1$ to the auxiliary memory 40a through the OR gate 50a but, in this case, the memory 40a has been cleared already by the above clearing signal $CL_0$. It is understood from FIG. 4 that the righthand half of the control circuit 26 is excluded from this type of operation since the output signal of the AND gate 78 is not applied to the flip-flop 98. The "Q" signal "1" of the flip-flop 82 is applied as the start signal $ST_1$ through the OR gate 48 to the combination memory 36 to clear it and also to the combination generator 38 to close the switch 118 to start its operation. With the operation of the combination generator 38, combination selection is executed by the switches $30_1$, $30_2$, ... $30_n$, summing circuit 32 and judging circuit 34 as described in the aforementioned references and, at the same time, the content of the combination memory 36 is successively updated by the update signal UP from the judging circuit 34 to draw nearer and nearer towards the optimum combination. Upon completion of a cycle of operation combination sequence only, the combination generator 38 produces an END signal which is applied to the combination memory 36 to transfer its content to the both auxiliary memories 40a and 40b. The END signal is also applied to the AND gate 84 of the control circuit 28 together with "Q" signal of the flip-flop 82 to provide a read-out signal $RD_1$ to the auxiliary memory 40a to discharge its content to the gate drive circuits $54_1$, $54_2$, ... $54_n$, respectively. The signal $RD_1$ is also applied to "reset" input of the flip-flop 82 to reset it and, at the same time, to "set" input of the flip-flop 86 to set it to provide a control signal $GB_1$ from its "Q" output to the respective gate drive circuits. When any output signal $G_{ia}$ of the auxiliary memory 40a is binary "1", the AND gate drive circuit $54_i$ provides an unloading signal $B_i$ through the OR gate 66 to the driving mechanism (not shown) of the unloading gate $20_i$ to open it to discharge the content of the weighing cradle $18_i$ into the collection chute 22. The same matters occur simultaneously in the weighing units whose weight signals have resulted in binary "1" signals output from the memory 40a and the articles collected in the chute 22 will have an optimum total weight satisfying the predetermined weight condition. The signal $GB_1$ is delayed by the delay unit 88 and applied to "reset" input of the flip-flop 86 to reset it and also to "set" input of the flip-flop 90 to set it to provide another control signal $GA_1$ to the respective gate drive circuits 54. Thus, the AND gate 56 of the gate drive circuit $54_i$ provides a loading signal $A_i$ through the OR gate 64 to the driving mechanism (not shown) of the loading gate $16_i$ to open it to load the vacant weighing cradle $18_i$ with new articles from the feeder 10. The signal $GB_1$ is delayed by the delay unit 88 by a time sufficient for preventing the signal $GA_1$ from appearing before the gate $20_i$ is closed completely. The signal $GA_1$ is delayed by the delay unit 92 until the gate $16_i$ is closed and applied to "reset" input of the flip-flop 90 to reset it. The signal delayed by the delay unit 92 is further delayed by the delay unit 94 until the loaded weighing unit reaches its stable state and applied to the AND gate 78 through the OR gate 80. Thus, the next cycle of operation is initiated. While the operation is thus repeated in substantially the same fashion as the first cycle of operation except that the auxiliary memory 40a is cleared by the clearing signal $CL_1$ rather than $CL_0$, it can be stopped at any time by pushing the pushbutton switch 74 to reset the flip-flop 76.

The above-described first type of operation of this combination weighing machine is really no different from the operation of the prior art machine. The aforementioned features of this invention are obtained in the second and third types of operation as follow.

In the second type of operation, the switch 46 is closed so that the output signals $G_{1a}$, $G_{2a}$, ... $G_{na}$ of the auxiliary memory 40a can be applied also to the combination generator 38 through the OR gates $42_1$, $42_2$, ... $42_n$, respectively. As described previously with reference to FIG. 5, binary "1" output signals of the auxiliary memory 40a nullify the effects of the corresponding output signals of the combination generator 38 to the switches $30_1$, $30_2$, ... $30_n$. Accordingly, the weight signals from those weighing units which are elected in the preceding cycle of operation are not applied to the summing circuit 32 and the new combination selection is executed with the remaining weight signals. As the elected weighing units do not participate in the next combination selecting operation, one cycle time of machine operation is reduced correspondingly. Although the percent reduction of the cycle time was trivial in the past where the time required for unloading and loading the weighing cradle and then leading the weighing unit into stable state was much longer than the time required for the combination selecting operation, it has become significantly large with recent improvement of the mechanical structure which enabled such high speed operation as two cycles per second or more, for example. This type of operation is useful when the number of weighing units unloaded (and loaded) in each cycle is substantially less than half of the total number of weighing units, that is, less than n/2 in this embodiment.

In the third type of operation, the switches 46, 44 and 96 are all closed so that the output signals of the auxiliary memory 40b can be applied to the combination generator 38 as well as those of the auxiliary memory 40a and, moreover, the righthand half of the control circuit 26 of FIG. 4 is operable together with the lefthand half thereof. In this case, the first cycle of operation is executed in the same manner as the second type of operation under control of the lefthand half of the control circuit 28. However, at the beginning of the cycle, the output signal of the AND gate 78 is applied also through the switch 96 to "set" input of the flip-flop 98 to set it. The "Q" signal of the flip-flop 98 is delayed appropriately by the delay unit 100, for example, until the unloading gate control signal $GB_1$ is produced from the flip-flop 86, and then applied to the AND gate 102 to open it and also to "reset" input of the flip-flop 98 to reset it. The output signal of the AND gate 102 is applied to "set" input of the flip-flop 104 to set it and also to the auxiliary memory 40b as the clearing signal $CL_2$ to clear it. As understood easily from the drawing, the succeeding operation of the righthand half of the control circuit 28 is similar to the lefthand half thereof, except that the auxiliary memory 40b participates in the operation instead of the auxiliary memory 40a. More particularly, the combination selection operation starts in response to the start signal $ST_2$ with the weighing units which were not elected in the first cycle of operation since the elected weighing units are excluded by the output signals of the auxiliary memory 40a as described in conjunction with the second type of operation. The resultant content of the combination memory 36 is read out by the END signal and written in the cleared auxiliary memory 40b. The content of the memory 40b is read out by the read-out signal RD$_2$ and applied through the switch 44, OR gates 42 and switch 46 to the combination generator 38 to serve a function of excluding the corresponding weighing units from the next combination selecting operation. The output signals of the memory 40b are applied to the respective gate drive dircuits 54$_1$, 54$_2$, . . . 54$_n$ together with the control signals GB$_2$ and GA$_2$ to produce unloading and loading signals for the corresponding weighing units, similarly. In this type of operation, therefore, a pair of operations controlled by the both halves of the control circuit 26, respectively, intervene alternately and cyclically. It is apparent that the practical cycle time of operation of the machine is significantly reduced in this type of operation.

As described above, there three types of operation can be elected optionally by simply operating the switches 44, 46 and/or 96. This feature is very convenient for accomodating the machine to various operation schedules of the packing line.

It should be noted that the above description has been made about a preferred embodiment and various modifications and changes can be made within the scope of this invention. For example, though two auxiliary memories 40a and 40b are used in this embodiment, three or more auxiliary memories may be used. In this case, however, one or more circuits similar to the righthand half of the control circuit 26 must be cascaded sequentially after (in the right of) said righthand half, and the gate drive circuits 54 must be modified correspondingly. While, in the control circuit 26 of FIG. 4, the righthand half is arranged to respond to a signal (CL$_1$) applied from the lefthand half to start operation, The cascaded circuits may be actuated by separately produced timing signals.

The combination generator 38 may be composed of a normal binary counter. In this case, it may be arranged that "1" level output signals of the OR gates 42 inhibit the corresponding output signals of the combination generator 38. In this case, however, the abovementioned second type of operation is naturally impossible. The combination generator 38 may be modified such that, omitting the OR gates 122 as in the case of normal binary counter, another pulse train from a second clock pulse generator of extremely high frequency as compared with the clock pulse generator 116 is applied to "T" input of the flip-flop 122$_1$ in response to logic sum of the output signals of the AND gates 124, thereby the very high frequency pulses are counted until the "Q" output signal of the corresponding stage becomes "0" level.

I claim:

1. A combination weighing machine, comprising a plurality of weighing units having individual loading and unloading means for an article or articles each for weighing said article or articles each to produce signals indicative of the measured weights, respectively; a plurality of normally-open switches having a control terminal each and corresponding to said weighing units, respectively; judging means coupled to receive said weight signals of the weighing units through said switches for producing an output signal when the sum of the incoming weight signals satisfies a predetermined weight condition; a combination generator having output terminals coupled respectively to said normally-open switches for producing output signals from said output terminals sequentially in accordance with a predetermined set of mathematical combinations to close the corresponding ones of said normally-open switches; a combination memory coupled to the output terminals of said combination generator for responding to the output signal of said judging means to store the current combined output signals of said combination generator; and control means for supplying the content of said combination memory to said loading and unloading means of the respective weighing units to control them at each end of said predetermined combination operation of said combination generator; characterized in that said control means comprises at least two auxiliary memories coupled to the output terminals of said combination memory for storing its combined output signals, a plurality of sub-control means corresponding respectively to said auxiliary memories for reading out their contents and supplying them separately to said loading and unloading means of the respective weighing units, and switch means for supplying said contents read out by said sub-control means selectively to said combination generator; and said combination generator includes means responsive to the contents of said auxiliary memories for inhibiting corresponding ones of its output signals.

2. A combination weighing machine, in accordance with claim 1, characterized in that said sub-control means include means for shifting their operation starting times with respect to each other.

3. A combination weighing machine, in accordance with claim 1, characterized in that said combination generator comprises a clock pulse generator for producing clock pulses and a binary counter for counting said clock pulses, and said inhibiting means includes means responsive to a specific level of the output signals of said auxiliary memories for inverting the output signal levels of the corresponding stages of said counter.

4. Apparatus for delivering quantities of product measured by weight, with each quantity being of an acceptable weight relative to a reference weight, comprising a set of balances each adapted to weigh a fraction of said quantity and each adapted for unloading of product therefrom to contribute to a delivery, means for generating the values of combinations of weights on the balances and comparing the values with an acceptable weight standard to select a combination of the balances to be unloaded to deliver said acceptable weight quantity, means for unloading the balances of the selected combination for said delivery, and means for loading the balances which were unloaded, characterized in having means for effecting operation of the apparatus in three different modes comprising:

(a) a first mode in which, for each delivery, the generating means generates the values of the combinations of weights on all the balances upon completion of the loading of balances which were unloaded on the previous delivery and the generated values are compared with said standard, (b) a second mode in which, for each delivery, the generating means generates the values of the combinations of the weights on the balances excluding those balances which were unloaded on the previous delivery and the generated values are compared with said standard, and (c) a third mode in which, for each delivery, the generating means generates the values of the combinations of the weights on the balances excluding those balances which were selected for the previous delivery, before completion of the loading operation of said selected balances, and the generated values are compared with said standard.

5. Apparatus for delivering quantities of product measured by weight, with each quantity being of an acceptable weight relative to a reference weight, comprising a set of balances each adapted to weigh a fraction of said quantity and each adapted for unloading of product therefrom to contribute to a delivery, means for generating the values of combinations of weights on the balances and comparing the values with an acceptable weight standard to select a combination of the balances to be unloaded to deliver said acceptable weight quantity, means for unloading the balances of the selected combination for said delivery, and means for loading the balances which were unloaded, characterized in having means for effecting operation of the apparatus in different modes comprising:
(a) a mode in which, for each delivery, the generating means generates the values of the combinations of weights on all the balances upon completion of the loading of balances which were unloaded on the previous delivery and the generated values are compared with said standard, and
(b) a mode in which, for each delivery, the generating means generates the values of the combinations of the weights on the balances excluding those balances which were unloaded on the previous delivery and the generated values are compared with said standard.

6. Apparatus for delivering quantities of product measured by weight, with each quantity being of an acceptable weight relative to a reference weight, comprising a set of balances each adapted to weigh a fraction of said quantity and each adapted for unloading of product therefrom to conbtribute to a delivery, means for generating the values of combinations of weights on the balances and comparing the values with an acceptable weight standard to select a combination of the ballances to be unloaded to deliver said acceptable weight quantity, means for unloading the balances of the selected combination for said delivery, and means for loading the balances which were unloaded, characterized in having means for effecting operation of the apparatus in different modes comprising:
(a) a mode in which, for each delivery, the generating means generates the values of the combinations of weights on all the balances upon completion of the loading of balances which were unloaded on the previous delivery and the generated value are compared with said standard, and
(b) a mode in which, for each delivery, the generating means generates the values of the combinations of the weights on the balances excluding those balances which were selected for the previous delivery, before completion of the loading operation of said selected balances, and the generated values are compared with said standard.

7. Apparatus for delivering quantities of product measured by weight, with each quantity being of an acceptable weight relative to a reference weight, comprising a set of balances each adapted to weigh a fraction of said quantity and each adapted for unloading of product therefrom to contribute to a delivery, means for generating the values of combinations of weights on the balances and comparing the values with an acceptable weight standard to select a combination of the balances to be unloaded to deliver said acceptable weight quantity, means for unloading the balances of the selected combination for said delivery, and means for loading the balances which were unloaded, characterized in having means for effecting operation of the apparatus in different modes comprising:
(a) a mode in which, for each delivery, the generating means generates the values of the combinations of the weights on the balances excluding those balances which were unloaded on the previous delivery and the generated values are compared with said standard, and
(b) a mode in which, for each delivery, the generating means generates the values of the combinations of the weights on the balances excluding those balances which were selected for the previous delivery, before completion of the loading operation of said selected balances, and the generated values are compared with said standard.

* * * * *

UNITED STATES PATENT AND TRADEMARK OFFICE
CERTIFICATE OF CORRECTION

PATENT NO. : 4,441,567
DATED : April 10, 1984
INVENTOR(S) : Takashi Hirano

It is certified that error appears in the above—identified patent and that said Letters Patent is hereby corrected as shown below:

Column 3, line 7, "suffic" should read -- suffix --; line 53, "72" should read -- 34 --; lines 67-68, "from the each" should read -- from each --. Column 4, line 17, "and" should read -- an--; line 65, "inputs" should read -- input --; Column 5, line 32, "the aforementioned read-out" should read -- the read-out --; line 37, "through a delay" should read -- through a delay unit 92 and a delay --; line 38, "gate 80." should read -- gate 80 and through unit 92 only to the "reset" input of flip-flop 90.--; line 59, "aforementioned read-out" should read -- read-out--;

Column 6, line 19, "$G_2$ ... " should read -- $G_2$ ... $G_n$ --. Column 7, line 9, "26" should read -- 28 --; line 38, "AND gate" should read -- AND gate 58 of the gate -- ; line 53, "54i" should read -- $54_i$ --. Column 8, line 18, "are" should read -- were --; line 42, "26" should read -- 28 --. Column 9, line 9, "dircuits" should read -- circuits --; line 18, "there"" should read -- these --; line 33, "26" should read -- 28 --; line 35, "The" should read -- the --. Column 11, line 37, "the conbtribute" should read -- to contribute --; line 41, "ballances" should read -- balances --. Column 12, line 7, "value" should read -- values --.

Signed and Sealed this

Twentieth Day of November 1984

[SEAL]

Attest:

GERALD J. MOSSINGHOFF

Attesting Officer    Commissioner of Patents and Trademarks